US007750269B2

(12) United States Patent
Barclay et al.

(10) Patent No.: US 7,750,269 B2
(45) Date of Patent: Jul. 6, 2010

(54) LASER FOR FORMING BAGS FROM A WEB OF MATERIAL

(75) Inventors: Ian J. Barclay, Marion, NY (US); Michael W. McManus, Marion, NY (US); Dana A. Marshall, Frontenac, MO (US)

(73) Assignee: Pactiv Corporation, Lake Forest, IL (US)

( * ) Notice: Subject to any disclaimer, the term of this patent is extended or adjusted under 35 U.S.C. 154(b) by 0 days.

(21) Appl. No.: 11/742,294

(22) Filed: Apr. 30, 2007

(65) Prior Publication Data

US 2007/0199928 A1    Aug. 30, 2007

(51) Int. Cl.
  *B31B 1/14*    (2006.01)
  *B23K 26/02*    (2006.01)
  *B23K 26/40*    (2006.01)

(52) U.S. Cl. .................... 219/121.67; 493/227; 493/341

(58) Field of Classification Search ................................ 219/121.67–121.72, 121.82; 493/238, 341, 493/369, 374, 394, 923, 962, 186, 189, 194–196, 493/199–201, 213, 214, 102, 135, 193; 264/482; 131/281; 156/251, 269
See application file for complete search history.

(56) References Cited

U.S. PATENT DOCUMENTS

| | | | | |
|---|---|---|---|---|
| 2,737,859 | A | * | 3/1956 | Allison et al. ................ 493/194 |
| 3,226,527 | A | * | 12/1965 | Harding ....................... 219/384 |
| 3,612,814 | A | * | 10/1971 | Houldcroft ............. 219/121.67 |
| 3,808,394 | A | | 4/1974 | Mominee et al. |
| 3,809,474 | A | * | 5/1974 | Mihalik ....................... 399/148 |
| 3,955,584 | A | * | 5/1976 | Molins et al. ................. 131/96 |
| 3,971,299 | A | | 7/1976 | Whittle et al. |
| 3,981,230 | A | | 9/1976 | Lee |
| 3,986,914 | A | | 10/1976 | Howard |
| 4,005,970 | A | * | 2/1977 | Leloux ....................... 425/392 |
| 4,049,945 | A | | 9/1977 | Ehlscheid et al. |
| 4,094,729 | A | | 6/1978 | Boccia |
| 4,115,183 | A | * | 9/1978 | Achelpohl et al. .......... 156/515 |
| 4,115,913 | A | * | 9/1978 | Moriya et al. ................ 29/450 |
| 4,218,606 | A | * | 8/1980 | Whitman, III ........... 219/121.6 |

(Continued)

FOREIGN PATENT DOCUMENTS

FR    2357315 A    *    3/1978

(Continued)

*Primary Examiner*—Samuel M Heinrich
(74) *Attorney, Agent, or Firm*—Baker Botts L.L.P.

(57) ABSTRACT

A fastener includes first and second tracks. The first track includes a first profile, and the second track includes a second profile for interlocking with the first profile. The fastener extends between opposing ends. The first and second profiles at each of the opposing ends are sealed to each other using a laser. In one embodiment, the fastener is initially continuous and is subsequently divided into segments by simultaneously cutting and sealing the fastener at spaced target locations using the laser. The segments are associated with respective plastic bags. At each of the target locations, the laser directs a laser beam at the fastener such that the laser beam cuts through the first and second profiles and simultaneously seals the first and second profiles to each other on opposite sides of the cut. The seals on the opposite sides of the cut terminate respective ends of adjacent ones of the segments.

33 Claims, 11 Drawing Sheets

U.S. PATENT DOCUMENTS

| | | | |
|---|---|---|---|
| 4,247,349 A * | 1/1981 | Detert et al. | 156/108 |
| 4,302,654 A * | 11/1981 | Bennett et al. | 219/121.71 |
| 4,359,748 A * | 11/1982 | Pasini et al. | 347/217 |
| 4,396,449 A * | 8/1983 | Tumminia | 156/251 |
| 4,507,535 A * | 3/1985 | Bennett et al. | 219/121.71 |
| 4,648,318 A * | 3/1987 | Fischer | 101/415.1 |
| 4,672,168 A * | 6/1987 | Saunders et al. | 219/121.7 |
| 4,675,496 A * | 6/1987 | Toyoshima et al. | 219/121.64 |
| 4,820,254 A * | 4/1989 | Ziegelhoffer | 493/194 |
| 4,826,595 A * | 5/1989 | Franke | 210/386 |
| 4,847,462 A * | 7/1989 | Soodak et al. | 219/121.63 |
| 4,892,512 A | 1/1990 | Branson | |
| 4,896,685 A | 1/1990 | Lawrence | |
| 4,916,272 A * | 4/1990 | Okumoto et al. | 219/121.7 |
| 4,945,203 A | 7/1990 | Soodak et al. | |
| 4,976,673 A | 12/1990 | Smith et al. | |
| 5,014,978 A * | 5/1991 | Smith et al. | 271/308 |
| 5,062,825 A | 11/1991 | Smith et al. | |
| 5,088,971 A | 2/1992 | Herrington | |
| 5,131,121 A | 7/1992 | Herrington, Jr. et al. | |
| 5,203,556 A * | 4/1993 | Smith et al. | 271/308 |
| 5,213,649 A | 5/1993 | Sepavich et al. | |
| 5,225,649 A | 7/1993 | Andreoli et al. | |
| 5,279,693 A | 1/1994 | Robinson et al. | |
| 5,354,964 A * | 10/1994 | Kyoren et al. | 219/121.84 |
| 5,382,773 A | 1/1995 | Kurihara et al. | |
| 5,405,478 A | 4/1995 | Richardson et al. | |
| 5,436,695 A * | 7/1995 | Lucking et al. | 355/76 |
| 5,448,807 A | 9/1995 | Herrington, Jr. | |
| 5,475,898 A * | 12/1995 | Holdsworth | 19/114 |
| 5,611,949 A | 3/1997 | Snellman et al. | |
| 5,689,936 A | 11/1997 | Kenney | |
| 5,690,125 A * | 11/1997 | Niemann et al. | 131/281 |
| 5,701,725 A * | 12/1997 | Neri et al. | 53/466 |
| 5,776,533 A * | 7/1998 | Okamoto et al. | 426/515 |
| 5,791,215 A * | 8/1998 | Morrison et al. | 83/13 |
| 5,944,278 A * | 8/1999 | Stevens et al. | 242/525.4 |
| 6,017,412 A | 1/2000 | Van Erden et al. | |
| 6,038,487 A | 3/2000 | Balster et al. | |
| 6,046,427 A | 4/2000 | Richter et al. | |
| 6,056,682 A | 5/2000 | Belanger et al. | |
| 6,064,032 A | 5/2000 | Voss et al. | |
| 6,103,050 A | 8/2000 | Krueger | |
| 6,168,558 B1 | 1/2001 | Vinberg | |
| 6,235,445 B1 * | 5/2001 | Nakamura et al. | 430/200 |
| 6,255,620 B1 | 7/2001 | Gershenson | |
| 6,325,068 B1 | 12/2001 | Dombek | |
| 6,383,124 B1 * | 5/2002 | St. Germain et al. | 493/353 |
| 6,427,295 B1 | 8/2002 | Matsumoto et al. | |
| 6,429,411 B1 * | 8/2002 | Iwasaki et al. | 250/201.5 |
| 6,470,551 B1 | 10/2002 | Provan et al. | |
| 6,508,969 B1 | 1/2003 | Kolovich et al. | |
| 7,367,931 B2 | 5/2008 | Barclay et al. | |

FOREIGN PATENT DOCUMENTS

| | | | |
|---|---|---|---|
| JP | 402276762 A * | 11/1990 | |
| JP | 406190951 A * | 7/1994 | |
| JP | 406218566 A * | 8/1994 | |
| JP | 411286176 A * | 10/1999 | |
| WO | WO/98/16430 | 4/1998 | |

* cited by examiner

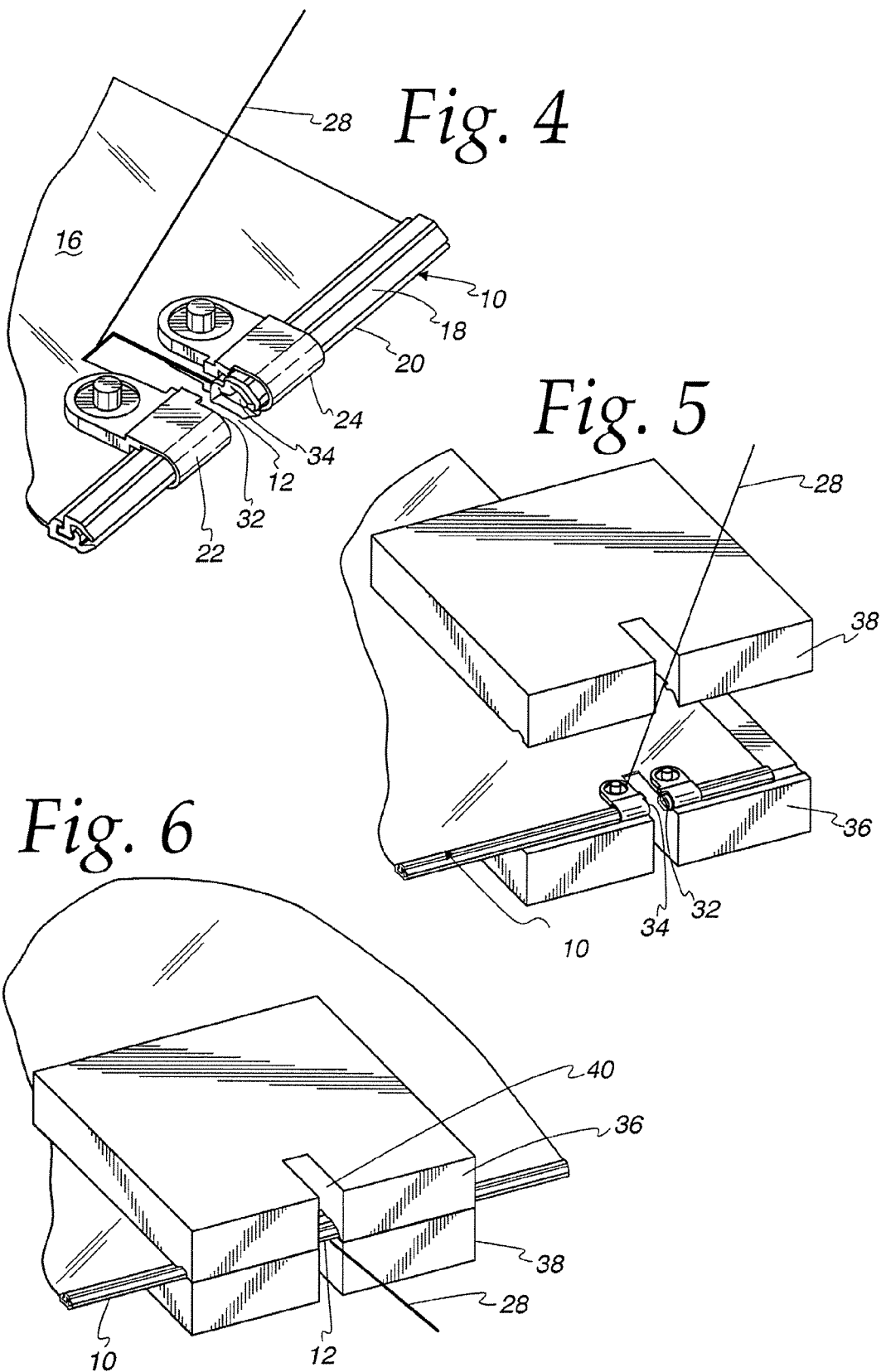

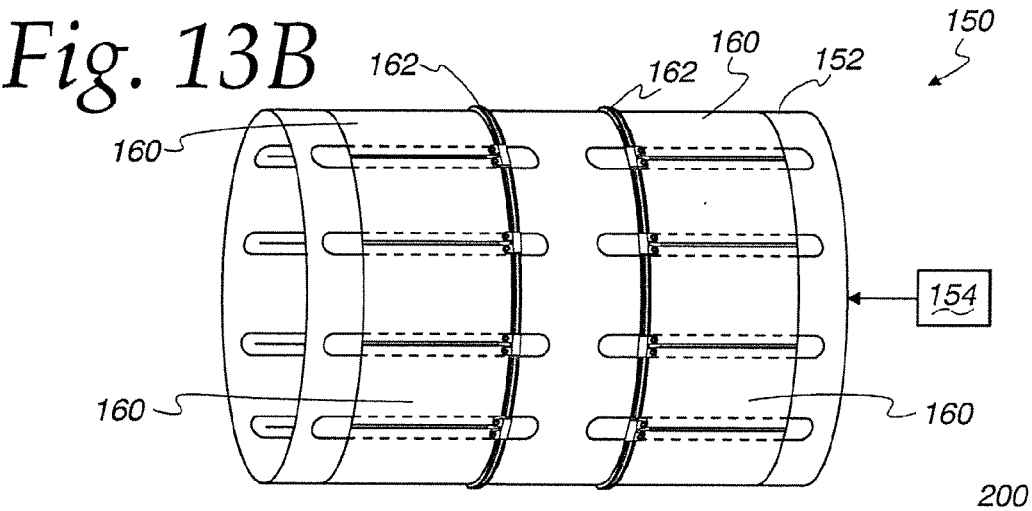
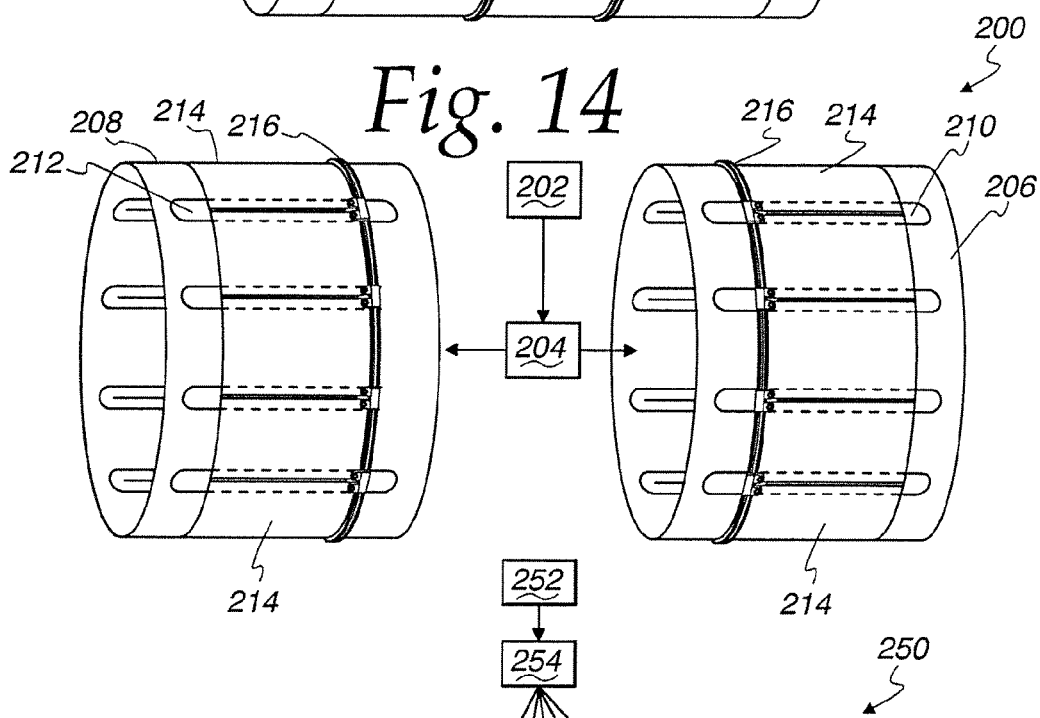
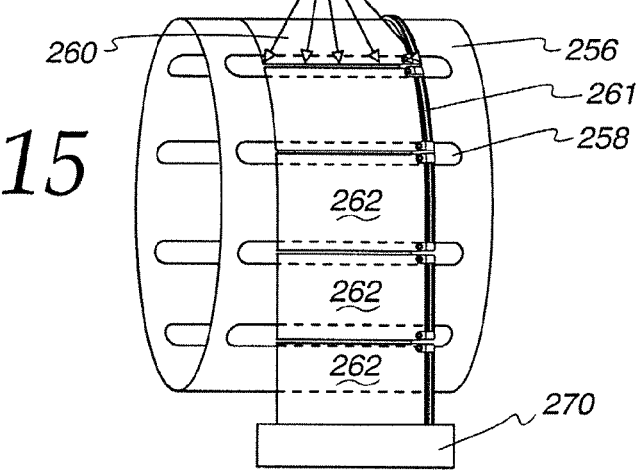

LASER FOR FORMING BAGS FROM A WEB OF MATERIAL

RELATED APPLICATIONS

This application claims the benefit of priority of pending U.S. Nonprovisional application Ser. No. 10/021,236, filed Oct. 30, 2001, and of U.S. Provisional Patent Application No. 60/244,281, filed Oct. 30, 2000; the entire contents of which are hereby incorporated by reference.

FIELD OF THE INVENTION

The present invention generally relates to reclosable plastic bags and, more particularly, to using a laser for terminating opposing ends of a fastener for opening and closing such a bag and for cutting the plastic bag itself.

BACKGROUND OF THE INVENTION

A typical reclosable bag includes a fastener along one side for opening and closing the bag. The fastener includes first and second tracks. The first track includes a first profile, and the second track includes a second profile for interlocking with the first profile. To form the bag, the bag is generally thermally sealed along much of its periphery, except possibly along the one side where the fastener is located. The fastener includes opposing ends, and the peripheral seal terminates the opposing fastener ends to hopefully prevent fluid from leaking out of the bag via the fastener ends.

The termination of the fastener ends becomes more difficult to perform successfully as manufacturing speeds are increased. Specifically, as manufacturing speeds are increased, the dwell time for thermal sealing and the cooling time for subsequent cooling must be decreased. This, in turn, increases the likelihood of leaks at the opposing ends of the fastener because it is more difficult to transfer sufficient heat into the fastener material at the opposing fastener ends to render that area leakproof.

Additionally, a mechanical knife is used to cut the web of material into individual bags. The knife becomes dull over time, leading to jagged edges along the individual bags that are not aesthetically pleasing. Accordingly, the repetitious wear on the knife requires it to be replaced on a periodic basis.

It would be desirable to increase manufacturing speeds without compromising the integrity of the terminations at the opposing ends of the fastener or the edges of the bag.

SUMMARY OF THE INVENTION

In the present invention, a fastener includes first and second tracks. The first track includes a first profile and the second track includes a second profile for interlocking with the first profile. The fastener extends between opposing ends. The first and second profiles at each of the opposing ends are sealed to each other using a laser.

In one embodiment, the fastener is initially continuous and is subsequently divided into segments by simultaneously cutting and sealing the fastener at spaced target locations using the laser. The segments are associated with respective plastic bags. At each of the target locations, a laser beam is directed at the fastener such that the laser beam cuts through the first and second profiles and simultaneously seals the first and second profiles to each other on opposite sides of the cut. The seals on the opposite sides of the cut terminate respective ends of adjacent ones of the segments. In another embodiment, the laser beam acts upon an end termination component that is mounted on the fasteners to weld the material comprising that component with the material of the fastener.

In a further embodiment, a laser is used to seal and cut the web at locations that will be the side edges of the bag. Thus, the laser cuts and seals the fastener and cuts and seals the side edges of the bag.

The present invention also contemplates a machine and method for performing the laser sealing and laser cutting of flexible material into segments, such as a polymeric web in which the segments will ultimately be individual bags. The machine includes a generally cylindrical drum having openings on an exterior surface. A vacuum manifold cooperating with the openings on the exterior surface for holding the flexible material on the exterior surface. A laser produces a laser beam that contacts the flexible material while the flexible material is being held on the drum.

BRIEF DESCRIPTION OF THE DRAWINGS

Other objects and advantages of the invention will become apparent upon reading the following detailed description and upon reference to the drawings.

FIG. 4 is an enlarged isometric view of the target location after generating the end terminations at that location.

FIG. 5 is an enlarged isometric view of a target location for which a laser generates end terminations while bottom and top molds for injection molding end stops onto the fastener are opened.

FIG. 6 is an enlarged isometric view of a target location for which a laser generates end terminations while the bottom and top molds are closed and the molds are provided with a slot.

FIGS. 13a and 13b schematically illustrate a drum system on which a web of the material passes while the end terminations of the fastener are cut with a laser.

FIG. 14 schematically illustrates another drum system on which a web of material passes while end terminations of the fastener are cut with a laser.

FIG. 15 illustrates a drum system on which a web of material is cut into individual bags.

Figure 1:
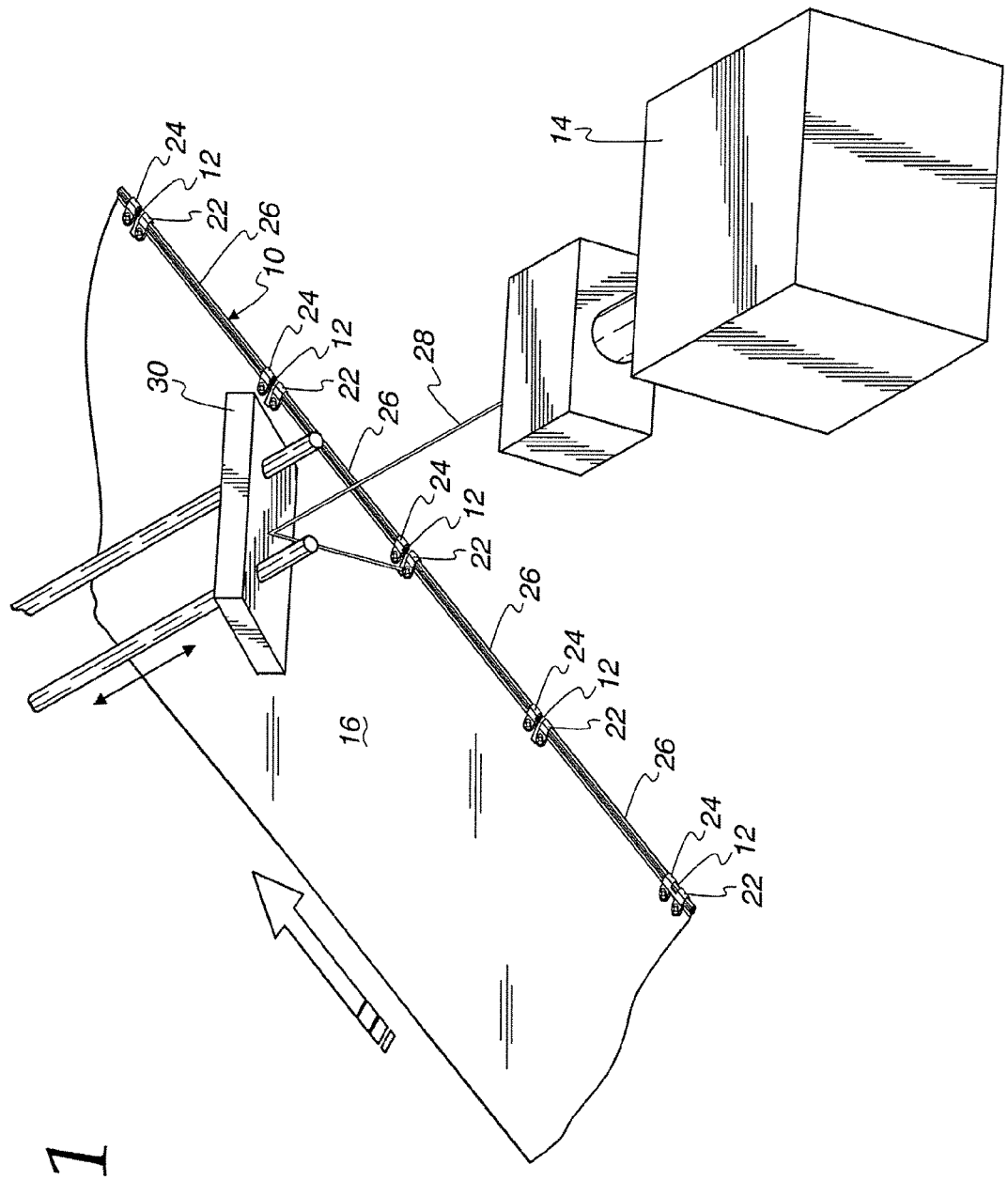
FIG. 1 is an isometric view of a method of generating end terminations along a fastener at spaced target locations using a laser.

While the invention is susceptible to various modifications and alternative forms, a specific embodiment thereof has been shown by way of example in the drawings and will herein be described in detail. It should be understood, however, that it is not intended to limit the invention to the particular forms disclosed but, on the contrary, the intention is to cover all modifications, equivalents, and alternatives falling within the spirit and scope of the invention as defined by the appended claims.

DESCRIPTION OF ILLUSTRATIVE EMBODIMENTS

Turning to the drawings, FIG. 1 depicts a method of generating end terminations along a continuous fastener 10 at spaced target locations 12 using a laser 14. In the illustrated embodiment, the fastener 10 is attached to or integrally formed with a web 16 of plastic film. The web 16 may move continuously or intermittently. If movement of the web 16 is intermittent, the web 16 is stopped while the laser 14 cuts and seals the fastener 10 at one of the target locations 12. In an alternative embodiment, the fastener 10 is cut and sealed at the target locations 12 prior to attaching the fastener 10 to any web 16.

Figure 3:
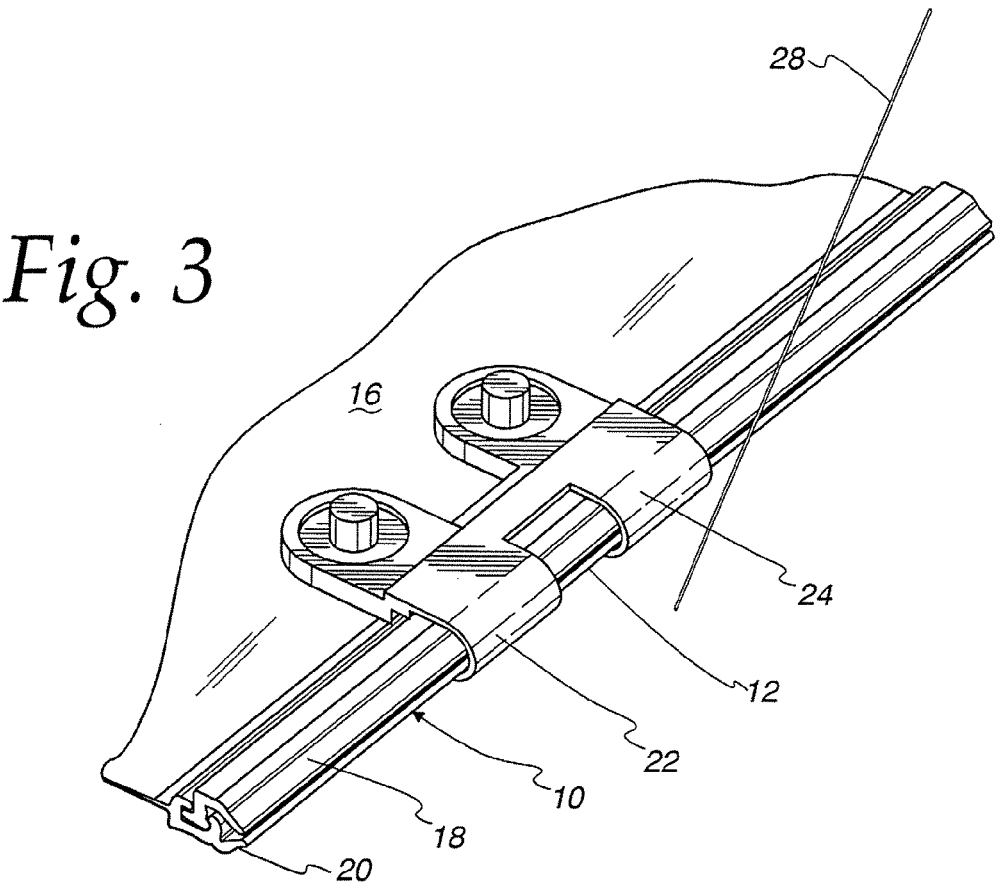
FIG. 3 is an enlarged isometric view of a target location prior to generating the end terminations at that location.

As shown best in FIGS. 3 and 4, the fastener 10 includes first and second tracks. The first track includes a first profile 18, and the second track includes a second profile 20 for interlocking with the first profile 18. One of the profiles 18, 20 preferably forms a groove, while the other profile preferably forms a rib for insertion into the groove. A pair of slider end stops 22, 24 may be located on opposite sides of each target location 12. If a fastener segment 26 between an adjacent pair of the target locations 12 is opened and closed with a slider (not shown) slidably mounted to the fastener segment 26, the molded end stops 22, 24 terminate the movement of the slider at opposite ends of the fastener segment 26. In one embodiment, the slider disengages the profiles 18, 20 as the slider is moved in an "opening" direction toward one of the end stops 22, 24, and engages the profiles 18, 20 as the slider is moved in a "closing" direction towards the other of the end stops 22, 24.

The fastener 10 is divided into the segments 26 by simultaneously cutting and sealing the fastener 10 at the spaced target locations 12 using the laser 14. The segments 26 are associated with respective plastic bags. The laser 14 emits a laser beam 28 that is swept across the fastener 10 at a target location 12 using either (1) a fixed beam linear system in FIG. 1, or (2) a galvanometer-based system in FIG. 2. Depending on the size of the laser, it is also possible to have the laser pivotably mounted such that its movement causes the beam movement necessary for the cut. The fixed beam linear system in FIG. 1 employs a reciprocating reflector or mirror 30 that moves in a diagonal across the web 16 and re-directs the laser beam 28 onto the target location 12. The galvanometer-based system in FIG. 2 aims the laser beam 28 directly at the target location 12 and uses a galvanometer mirror unit 31 to swing the beam 28 in an x-y plane. The laser beam 28 is oriented at an angle close to 90 degrees relative to the plane of the web 16. As shown in FIG. 3, prior to cutting and sealing the fastener 10 at the target location 12, the laser beam 28 is aimed at a location just above the fastener 10. Then, while still activated, the laser beam 28 is swept across the fastener 10 and its profiles 18, 20 to the position depicted in FIG. 4. Such movement of the laser beam 28 may, for example, be accomplished with the reciprocating reflector 30 (see FIG. 1) or the galvanometer mirror unit 31 (see FIG. 2).

The laser beam 28 cuts through the fastener profiles 18, 20 and simultaneously seals the profiles 18, 20 to each other on opposite sides of the cut. The seals 32, 34 (see FIG. 4) on the opposite sides of the cut terminate respective ends of adjacent ones of the segments 26. In addition to cutting and sealing the profiles 18, 20, the laser beam 28 preferably cuts through and seals a portion of the fastener 10 and/or the plastic web 16 adjacent to the profiles 18, 20.

The use of a laser for terminating the opposing fastener ends is advantageous for several reasons. First, the laser is a low maintenance source with high energy and high efficiency, and can simultaneously cut and seal materials at extremely high speeds since the process requires minimal physical motion (rotation of a small mirror only). Second, the laser is very controllable in terms of accuracy and repeatability. In this regard, if the laser is used to cut and seal both the fastener profiles 18, 20 and the relatively thin portion of the fastener 10 and/or web 16 adjacent to the profiles, the strength of the laser beam may be easily "profiled" during the cut cycle so that the strength is greater while cutting the thicker profiles than while cutting the thinner adjacent portion. Third, the laser does not contact the fastener so, unlike prior non-laser systems, there are no knives to dull or wires to break and the process is very clean with little collection of debris, char, or grease. Fourth, the laser allows leakproof end terminations to be generated more quickly than end terminations generated by prior non-laser systems. Referring to FIG. 4, in experiments utilizing a 410 watt laser, it has been found that the fastener profiles 18, 20 can be cut and melted back to the end stops 22, 24 in about 140 milliseconds or less, which is significantly shorter than the amount of time it would take to cut and melt the profiles 18, 20 with a heated knife or wire(s).

In the embodiment illustrated in FIGS. 1-4, the fastener 10 is outfitted with the end stops 22, 24 in addition to the leak-proof end terminations 32, 34 (see FIG. 4) generated by the laser. The laser may melt the material from the molded end stops 22, 24, or from the bridge connecting the end stops on opposite sides of each target location 12, to the fastener 10 and adjoining web 16.

Referring to FIG. 5, if the end stops are injection-molded onto the fastener 10, the laser may be operated to generate the end terminations 32, 34 while the fastener 10 is situated in a bottom mold 36 used for injection molding after the top mold 38 has been pulled away from the bottom mold 36.

Figure 7:
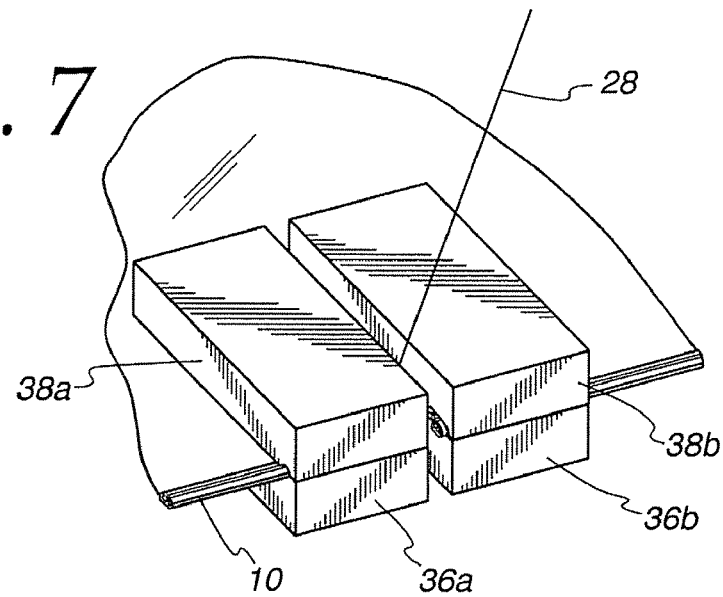
FIG. 7 is an enlarged isometric view of a target location for which a laser generates end terminations while the bottom and top molds are closed and each of the molds is divided into a pair of separate molds.

Referring to FIG. 6, the laser may alternatively be operated to generate the end terminations 32, 34 (not shown due to molds in FIG. 6) while the bottom and top molds 36, 38 are closed if the molds are provided with a slot 40 that exposes the fastener 10 at the target location 12 between the end stops that are to be injection molded. Referring to FIG. 7, in the absence of such a slot 40 from FIG. 6, each of the bottom and top molds may be divided into two separate molds such that there are a pair of separated bottom molds 36a, 36b and a pair of separated top molds 38a, 38b.

Further details concerning the injection molding process for forming end stops may be obtained from U.S. patent application Ser. No. 09/636,244 entitled "Injection-Molded End Stop For A Slider-Operated Fastener," filed Aug. 10, 2000, and incorporated herein by reference in its entirety.

Figure 8:
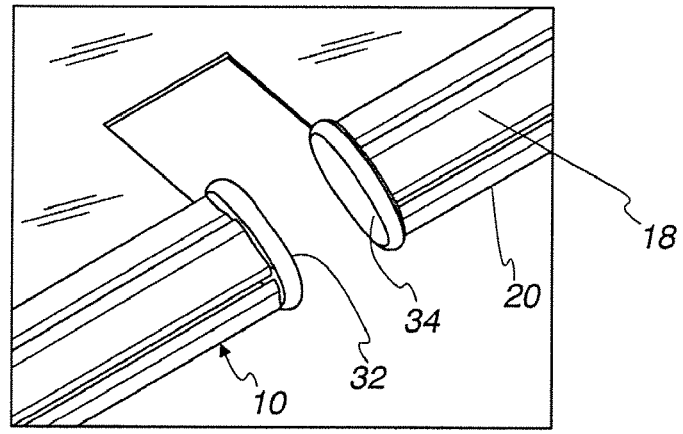
FIGS. 8, 9 and 10 are enlarged isometric views of a target location for which a laser generates end terminations that also serve as slider end stops.
Figure 9:
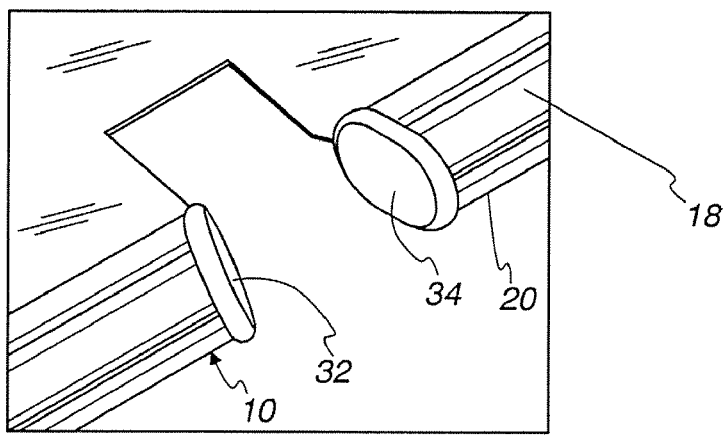
Figure 10:
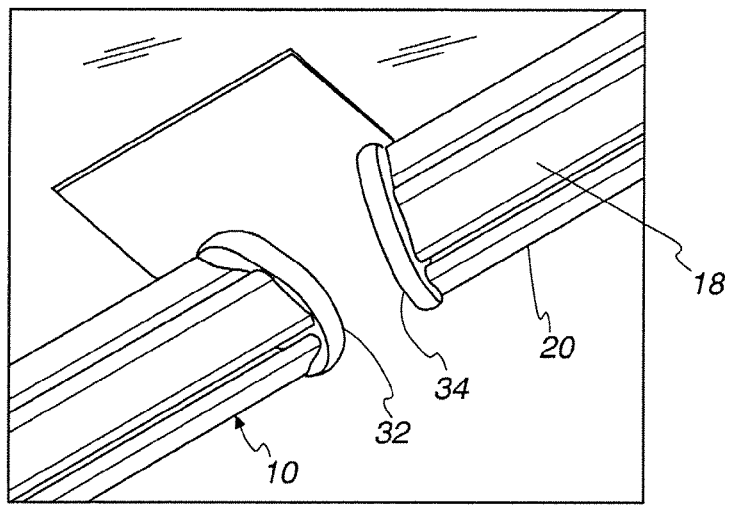

In the embodiments illustrated in FIGS. 8-10, the fastener 10 is not outfitted with end stops. Rather, the end terminations 32, 34 themselves are formed with sufficient bulk so as to serve as the end stops. The laser may melt the fastener profiles 18, 20 straight back as shown in FIG. 8 or at one of the angles shown in FIGS. 9 and 10. Also, while the end terminations 32, 34 are still in a molten state, the end terminations 32, 34 may be molded into a desired shape using chilled anvils of the type disclosed in U.S. Pat. No. 5,088,971 to Herrington and U.S. Pat. No. 5,131,121 to Herrington et al., which are incorporated herein by reference in their entireties.

The end terminations 32, 34 provided by laser sealing and laser cutting are superior to the prior art methods of cutting end terminations, which usually involved hot knives, shear knives, or ultrasonic machinery that typically contacts the fastener. The surface roughnesses of the end terminations 32, 34 of the present invention are much less than the prior art systems since there is no need for mechanically contacting the fastener (and end stops, if included) with a structure. In other words, when prior art systems cut the fastener (and end stops, if included) to create an end termination, the removal of these prior art devices from the fastener typically causes irregularities in the edges of the fastener (and end stops if included) because the material would catch on the fastener, thereby causing strings of material in some place and/or divots in others places. Thus, having a jagged edge was a by-product of these mechanical systems. To the contrary, the laser beam does not require any mechanical contact with the fastener as only the energy from the laser confronts the fastener (and end stops, if included). Thus, the inherent surface tension of the material is the primary force acting on the material after being cut so as to cause a generally smooth rounded surface. As mentioned above, it is also possible to add cold anvils to form the molten plastic if specific shapes are desired.

In addition to the enhanced aesthetics for the end termination brought about by the laser, the non-contact welding and cutting of the fastener with a laser provides a substantial benefit in terms of the sealing ability of the bag. When prior art systems are used, the mechanical contact required to cut and/or seal the fastener may warp the interlocking profiles adjacent to the edge on the fastener where the cutting and/or sealing took place, especially when the knives become dull. Because these profiles are the structures that provide the sealing function to the opening of the bag, any warping may compromise the integrity of the seal provided by the profile. To the contrary, the pressure placed on the fastener during sealing and/or cutting with the laser is inconsequential, which leads to little, if any, disturbances in the interlocking profiles and a bag that seals well. As would be expected, the sealing integrity of the bag is quite important for consumer confidence in the bag.

Figure 2:
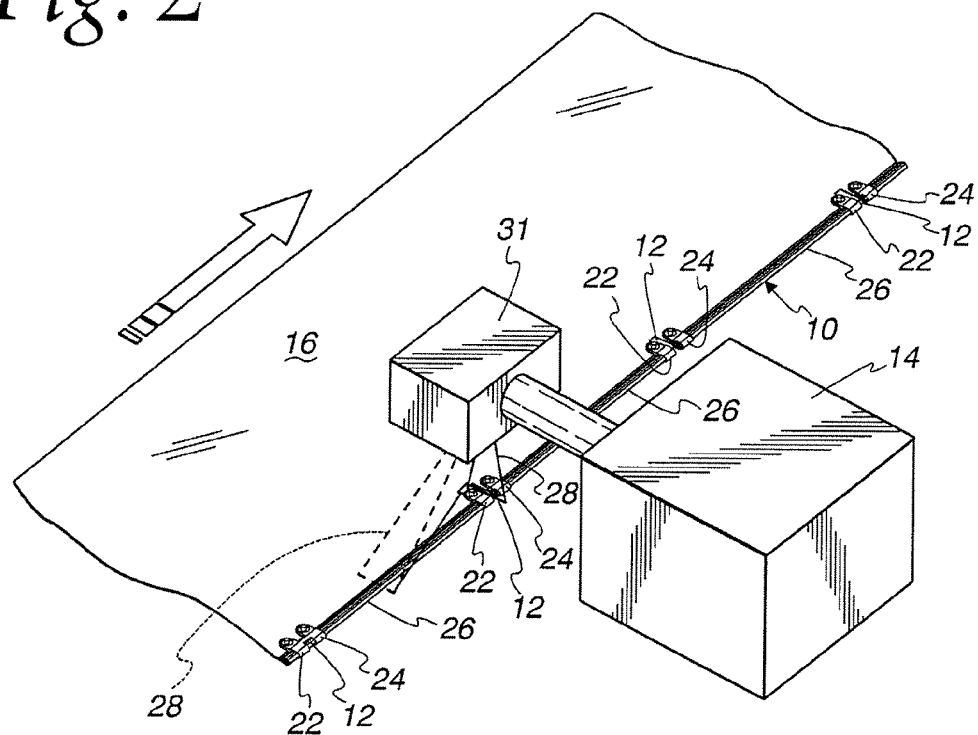
FIG. 2 is an isometric view of an alternative method of generating end terminations along a fastener at spaced target locations using a laser.

In addition to generating end terminations, the laser may be used to generate spaced main seals perpendicular to the direction of the web 16 in FIGS. 1 and 2. The main seals would be aligned with the respective target locations 12 and separate the interior of the web 16 into compartments associated with respective plastic bags. Alternatively, the main seals may be generated with conventional heated seal bars, while the laser is used to generate perforations or a cut line through the existing main seals. The perforations would allow adjacent plastic bags to be easily separated from each other, while a cut line would, in fact, separate the adjacent plastic bags from each other.

Figure 12A:
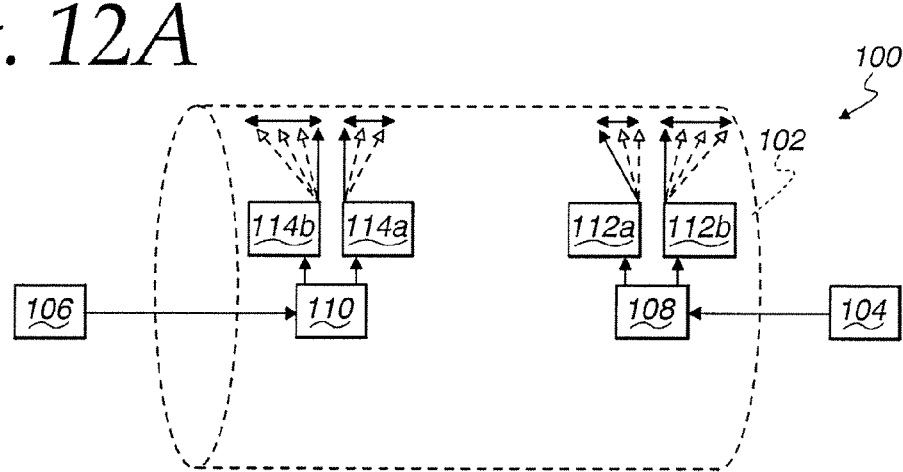
FIGS. 12a and 12b illustrate a drum system on which a web of material is cut into individual bags.
Figure 12B:
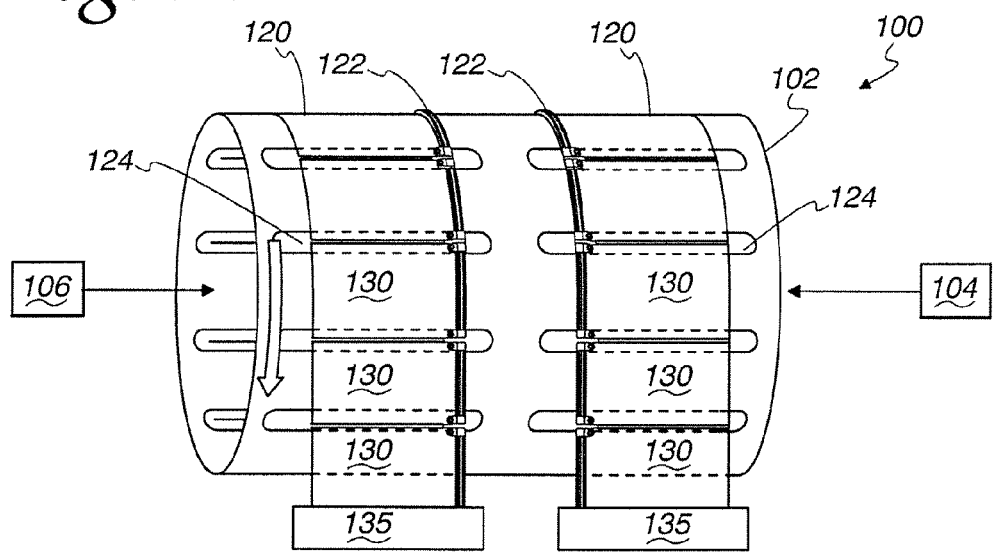

FIG. 12A schematically illustrates a cutting system 100 for cutting two lines of flexible material, which is shown in FIG. 12B as two webs of polymeric material for creating individual bags. The system 100 includes a rotatable drum 102 and two lasers 104, 106. The right laser 104 is external to the drum 102 and sends the beam toward the inside of the drum 102 to a beam splitter 108, which sends two beams to a pair of galvanometers 112a, 112b. Similarly, the left laser 106 is external to the drum 102 and sends the beam toward the inside of the drum 102 to a beam splitter 110, which sends two beams to a pair of galvanometers 114a, 114b. The galvanometers 112a, 112b, 114a, 114b steer their respective beams toward the interior surface of the drum 102. These two beams will act upon the corresponding sheet of flexible material located on the exterior surface of the drum 102 to cut and/or weld pieces of the flexible material.

The galvanometers 112a, 112b, 114a, 114b can be of the type commercially available through Cambridge Technologies, a subsidiary of Excel Technologies, or General Scanning, which is a division of GSI Lumonics, Inc. These galvanometers 112a, 112b, 114a, 114b are preferably multiple axis galvanometers in which the focal point can be maintained along a flat surface via f-Theta optics as the beam translates through a range of angles. If standard spherical optics are used, and the focal point remains at a constant distance from the optics as the beam translates through a range of angles (i.e., the focal point is on an arc) then it may be possible to have the exterior surface of a drum 102 have slight inward bowing (i.e., arcing) such that the focal point remains on the exterior surface where the web of material 120 is located.

Further, while galvanometers and other moveable mirrors are common for steering a beam, it is also possible to use an acousto-optic beam steering device that has an ultrasonic transducer in a high-index material. The ultrasonic transducer creates a grating in the material that steers the beam. While it is not as efficient as other beam steering devices, the acoustic-optic beam steering device has no moving parts and provides a high rate of beam steering.

FIG. 12B illustrates the system 100 in use on two webs of material 120. Each web 120 includes a fastener 122 attached at an end portion of the web 120. The web 120 is held on the drum 102 as the drum 102 rotates. Preferably, the web 120 is held on the drum 102 via a suctioning or vacuum system, such as the one disclosed with respect to FIGS. 16-23. The drum 102 includes a plurality of slots 124, which are the openings through which the laser beams will pass to act upon the web 120 and the fastener 122.

The laser beams from the galvanometers 112, 114 are directed in a certain radial direction. As the drum 102 rotates, one of the plurality of slots 124 moves into alignment with the radial direction of the laser beams. Accordingly, the laser beams from the galvanometers 112b, 114b seal the edges of the web 120 while simultaneously cutting the web 120 to form bags 130. Further, the laser beams from the galvanometers 112a, 114a seal the fasteners 122 and cut the fasteners 122 to form end terminations. These end terminations may be formed from the material comprising the fastener 122, or may be comprised of a material from an additional component located on the fastener 122 that the laser beam melts during the cutting and/or sealing process (e.g., the end stops 22, 24 of FIG. 4).

As shown in FIG. 12B, the bags 130 remain on the rotating drum 102 after being cut by the laser beams due to the web holding system, which can be the vacuum system described below. The bags 130 are then collected in the bag receptacle 135 adjacent to the drum 102 once they are released from the web holding system. Alternatively, the bags 130 may become detached from the web 120 at the location where the bags 130 will fall directly into the bag receptacle 135 once they have been cut by the laser.

Figure 13A:
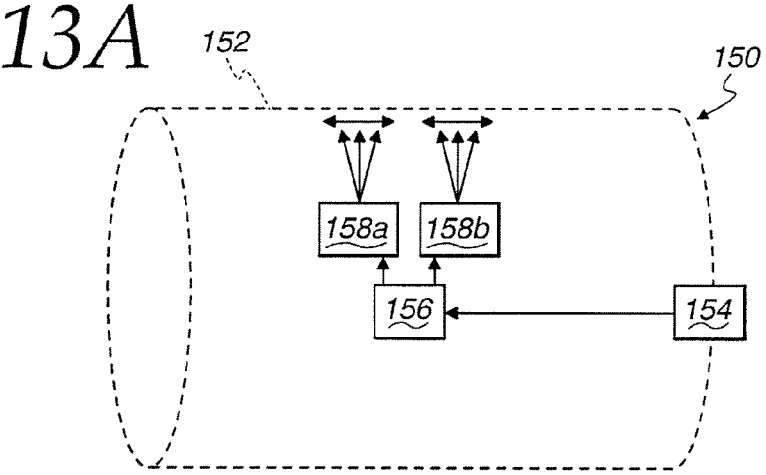
Figure 16:
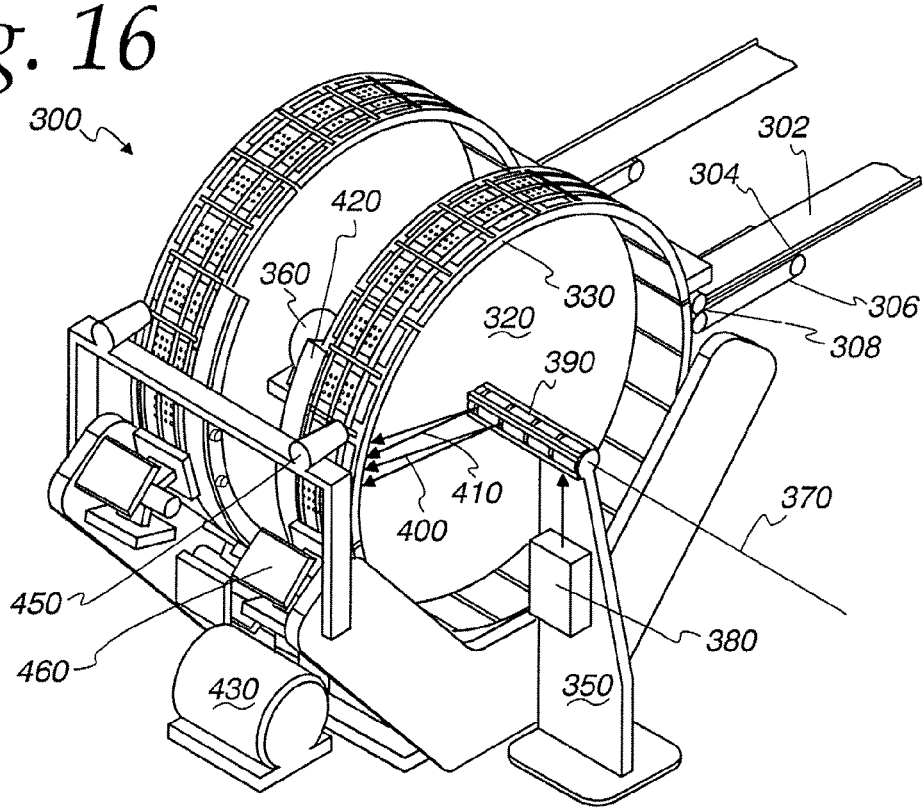
FIG. 16 illustrates an isometric view of a system having a pair of drums for processing two individual webs of material.
Figure 17:
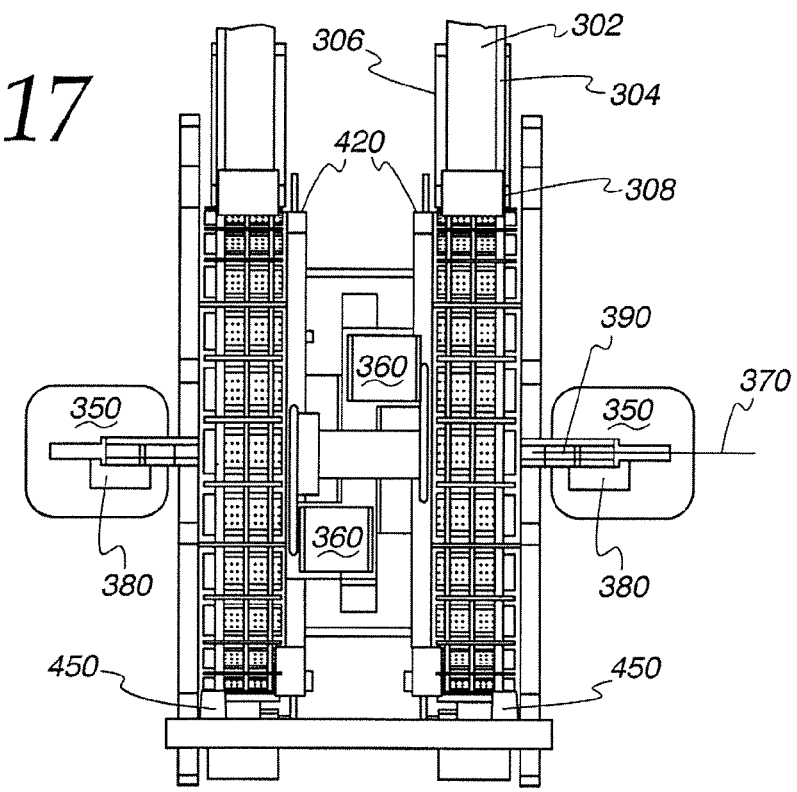
FIG. 17 is a top plan view of the system of FIG. 16.

FIG. 13A illustrates another system 150 for cutting a flexible piece of material. The system 150 includes a drum 152 on which the flexible material is moved. A laser 154 that is external to the drum 152 provides the laser beam to a beam splitter 156. The beam splitter 156 sends two laser beams to a pair of galvanometers 158a, 158b. The galvanometers 158a, 158b move the resultant laser beams across the drum 152, and act upon the flexible material to perform cutting and/or sealing.

FIG. 13B illustrates the system 150 with two webs of material 160 located against the drum 152. Preferably, the webs 160 are held against the drum 152 to register the webs 160 for cutting and/or sealing that is to be performed on the webs 160. In this configuration, each web 160 includes a fastener 162 which is acted upon by the laser beams from the galvanometers 158a, 158b. Specifically, the laser beams from the galvanometers 158a, 158b project through slots in the drum 152 and act upon the fasteners 162. Unlike the embodiment of FIG. 12, the system 150 does not cut the entire web 160, but instead only performs steps on the fasteners 162. Like the embodiment shown in FIGS. 1-9, the laser beams from the galvanometers 158a, 158b can heat the two parts of the fastener 162 to form a seal which will be located at the ends of the bags. Further, the laser beams can provide a cut through the fastener 162 so as to form an end termination. Additionally, the laser beams can cut through an additional component located on the fastener 162 to form an end termination from that additional component.

Once the operations on the fasteners 162 have been performed, the web 160 continues to move around the rotatable drum 152. Thus, the web 160 moves onto a station where a seal is made in the web 160 to define the edges of individual bags, and a cut will be made through the seal to release the bag from the web 160.

FIG. 14 illustrates a system 200 having a single laser 202 that sends a laser beam to a beam splitter 204. The laser beams from the beam splitter 204 are then sent into a first drum 206 and a second drum 208, which have slots 210, 212, respectively. Two webs of material 214 that each include an attached fastener 216 move across respective ones of the drums 206, 208. In this embodiment, the laser beams from the beam splitter 204 act upon the fasteners 216 so as to perform one of the functions mentioned above with respect to FIG. 13. A galvanometer or a movable mirror guide the laser beams from the beam splitter to the fasteners 216.

FIG. 15 schematically illustrates an alternative system 250 in which a laser 252 and an associated galvanometer 254 is positioned outside a drum 256. The drum 256 may have slots 258, although the slots 258 are not needed in this embodiment. The laser beam that is directed by the galvanometer 254 translates across the entire web 260 so as to seal and cut the web 260, and seal and cut a fastener 261 attached to the web 260. The laser beam may spend more time acting upon the fastener 261 than the web 260 because the fastener 261 is thicker and requires more energy to seal and cut. The control of the laser beam whereby more energy is focused in one region than another is performed by the galvanometer 254. Alternatively, the laser 252 can produce increased output power for the portion of the laser beam sweep that acts upon the fastener 261 than the output power that acts upon the web 260.

While the embodiments of FIGS. 12-14 illustrate one laser acting upon two webs of material, whether those webs are held on a large, single drum or two independent drums, it should be understood that the present invention contemplates using a single laser with a single drum holding a single web of material, where the laser beam from the laser projects radially outward from the inner part of the drum. Further, where laser energy is needed to act upon the web and the fastener, the present invention contemplates using two distinct lasers, one for performing functions upon the web and the other for performing functions upon the fastener. Alternatively, the system may use two lasers to act upon the fastener, and a third laser to act upon the web. Lastly, it is also possible to mechanically cut or process the web, while using the laser to cut, seal, or otherwise process the fastener (or vice-versa).

FIGS. 16-20 illustrate one preferred embodiment of a bag producing system 300 for processing two different webs on two different drums. Due to the redundancy in the system 300, the features required for processing just one of the webs will be described. A web of material 302 having an attached fastener 304 advances to a conveyor 306 at the end of which is a nip 308. After leaving the nip 308, the web 302 advances across the drum 320, which has a plurality of drum sections 330 that will be described in FIGS. 21-23 in more detail. Each of the drum sections 330 is in the shape of an arc, which in the embodiments of FIGS. 16-20, extend across 60 degrees of the 360 degree circumference. However, the drum sections 330 can be more or less in number.

Both drums 320 are supported by a pair of structures 350. A motor 360 provides the power to rotate each drum 320 around a central axis 370 that is common to both drums 320.

A laser 380 is mounted external to the drum 320 on the structure 350 and sends a laser beam to an optical assembly 390 located adjacent to or on the central axis 370. The optical assembly 390 may include various optical components for producing a first beam 400 and a second beam 410, such as a beam splitter to split the primary beam from the laser 380 into the first and second beams 400, 410. The optical assembly 390 may include steering mirrors or galvanometers for translating the beams 400, 410 across web 300 and the fastener 304. The optical assembly 390 may also include the focusing optics that will provide a focused beam at the location where the welding or cutting is to take place. As shown best in FIG. 20, the first beam 400, which has a smaller angle of translation, is for cutting and sealing the fastener 304. The second beam 410 is for cutting and sealing the web 302.

Of course, the laser 380 and optical assembly 390 can be of various types and be in various positions while still providing the first and second beams 400, 410 to the web 302 and fastener 304. For example, the laser 380 could be replaced by two lasers, where one laser provides the first beam 400 and the other provides the second beam 410 to one drum 320. Or, one laser and an associated beam splitter could provide all of the energy that is needed for both drums 320. Further, the laser or lasers 380 could be only for sealing the web 302 and/or fastener 304, and not for cutting. It is also possible to use one laser for sealing the web 302 and/or fastener 304 and a second laser for cutting the web 302 and/or fastener 304 after it has been sealed.

Because it is desirable to have the web 302 registered with respect to the drum sections 330 in a fixed position, the bag producing system 300 preferably has a web-holding system. This can be one of a variety mechanisms including mechanical clips or rollers that hold the web 302 relative to the drum sections 330, and preferably directly against the drum sections 330. One preferred method of holding the bag relative to the drum includes a vacuum system, which provides a suctioning force against the bag. The vacuum system does not necessarily create a true vacuum but, instead, provides a suctioning force that creates a pressure differential across the web 302 causing the web 302 to be held against the drum sections 330. The vacuum system includes a primary manifold 420 that is located on the inside edge of the drum 320. The primary manifold 420 of the vacuum system does not need to act upon the web 302 along the entire circumference of the drum 320. As shown best in FIGS. 16 and 18, a blower 430 pulls air from the primary manifold 420 so as to act only on the web 302 for about 180 degrees of the circumference of the drum 320. The detailed manner by which the primary manifold 420 acts upon the web 302 will be described below in connection with FIGS. 21-23, which illustrate the drum sections 330 and their internal manifolds and openings which apply pressure to the web 302.

Figure 18:
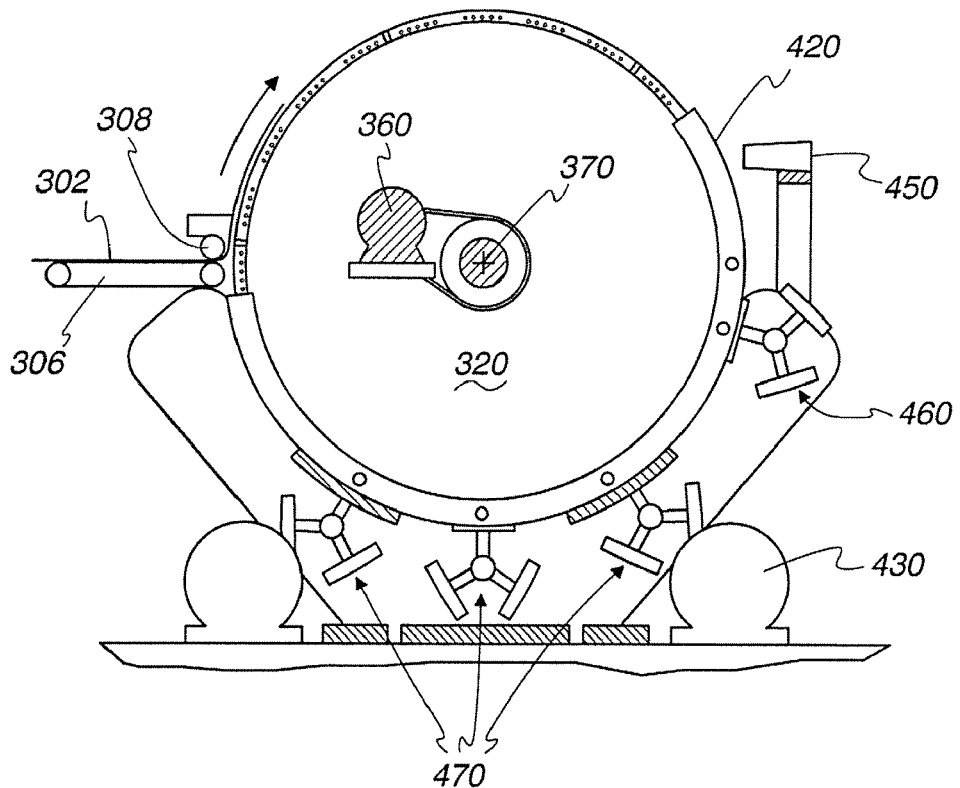
FIG. 18 is a side view of the system of FIG. 16 which highlights the bag collection mechanisms.
Figure 19:
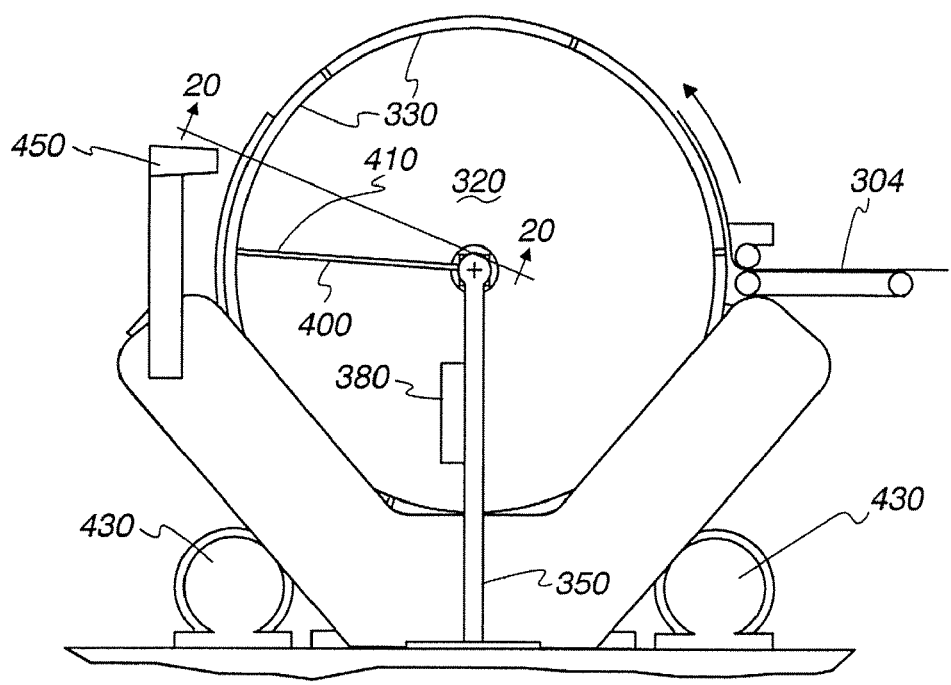
FIG. 19 is an opposing side view of the system of FIG. 16 which highlights the orientation of the lasers that cut the web of material.
Figure 20:
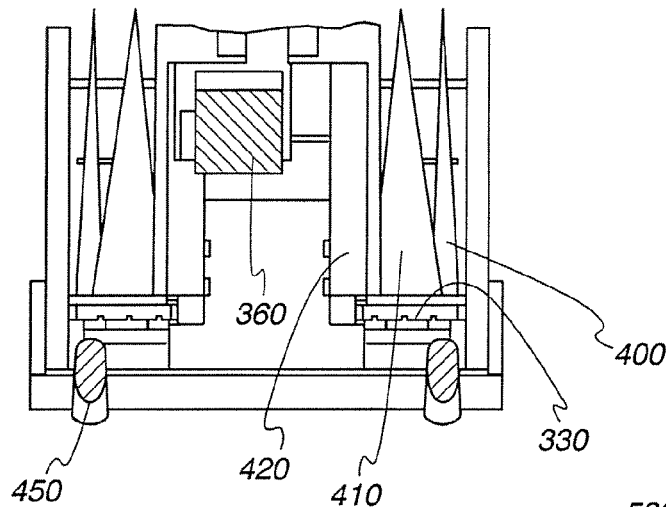
FIG. 20 is an enlarged view of the region of the system of FIG. 16 where the webs of material are cut by the lasers.

The system 330 includes an optical scanner 450 to examine the web 302 and fastener 304. Thus, the optical scanner 450 is a quality assurance tool. As shown, the optical scanner 450 is upstream from the laser beams 400, and 410 and determines whether the operations performed on the fastener 304 and/or web 302 have been done pursuant to certain criteria, such as the positioning of a slider on the fastener 304, the locations of any previous seals in the fastener 304 or web 302, or the position of any end stops (such as the ends stops 24 in FIGS. 1-5). The optical scanner 450 could also be located beyond the laser beams 400 and 410 and determine whether the laser 380 has provided the appropriate cuts and/or seals in the web 302 and the fastener 304. If the optical scanner 450 determines that there is an error in a bag, the bag is pulled from the drum 320 at a rejection station 460, which is shown in FIG. 18. On the other hand, bags meeting the quality criteria observed by the optical scanner 450 are sent to one or more bag collection stations 470.

In FIG. 18, there are three bag collection stations 470, each of which has three rotatable arms for pulling the bags from the drum sections 330 and stacking them in preparation for a final packaging step in which a certain number of bags is placed in a retail container, usually a paperboard box. Because the vacuum system that utilizes the manifold 420 is still holding the bags in place when they reach the bag collection stations 470, the bag collection stations 470 includes features, such as fingers, that pull the bag from the drum sections 330. As will be described below with respect to FIGS. 21-23, the drum sections 330 include grooves that allow for the bag to be scooped off the drum section 330 by fingers in the bag rejection and bag collection stations 460, 470.

Figure 21:
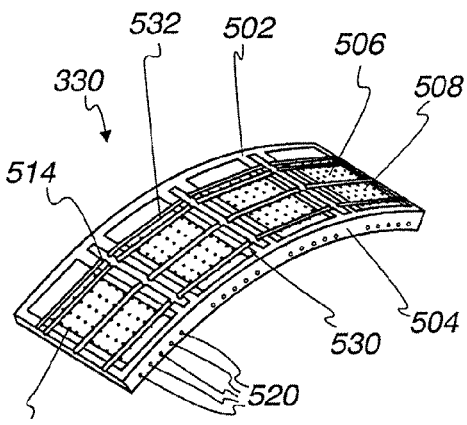
FIG. 21 is an isometric view of one of the drum sections used in this system of FIG. 16 for holding the web of material in the proper registration during the cutting process.
Figure 22:
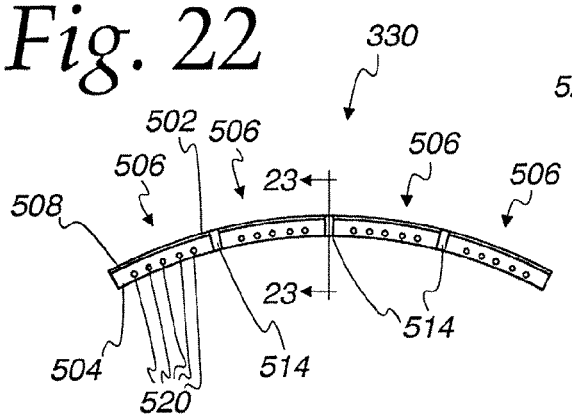
FIG. 22 is a side view of the drum section of FIG. 21.
Figure 23:
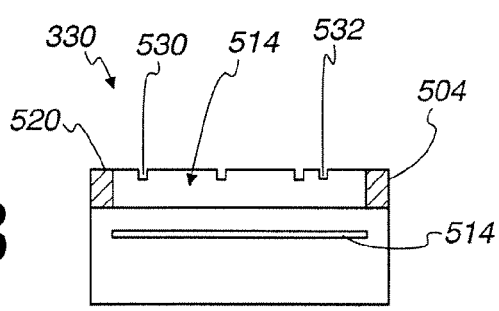
FIG. 23 is a cross-sectional view taken along line 23-23 of FIG. 22.

Referring now to FIGS. 21-23, the drum sections 330 that are mounted on the drum 320 of FIGS. 16-20 have various features that allow the bag producing system 300 to operate efficiently and accurately. Each drum section 330 includes an upper curved surface 502 and a side surface 504 generally perpendicular to the upper curved surface 502. The upper curved surface 502 has four bag stations 506 for receiving the web 302 and for defining the sections of the web 302 that will become an individual bag. Each bag station 506 has an engaging surface 508, which may be flat or curved inwardly, for engaging the web 302.

A slot 514 is located between each bag station 506 to define the edges of the bags to be produced from the web 302. The slot 514 is the region through which the laser beams 400 and 410 pass to perform the necessary functions on the web 302 and fastener 304. The length of each slot 514 is larger than the width of the web 302 so that the entire web 302 and the entire fastener 304 are exposed through the slot 514. When adjacent drum sections 330 are mounted on the drum 320, they are spaced apart by a distance that is substantially the same as the width of the slot 514 so that the laser beams 400 and 410 can perform functions to define a bag between the last bag on a leading drum section 330 and the first bag on the trailing drum section 330. While the slots 514 are straight and substantially parallel to produce straight edges in the bags, they can be curved or slightly non-parallel to provide a contour to the bag edge. In the situation where the slots are slightly non-parallel, there may be two slots directly adjacent to each other, one for cutting the leading edge of one bag and one for cutting the trailing edge of the adjacent bag.

The vacuum system, which includes the primary manifold 420 and the blower 430 mentioned above, cooperates with holes 520 in the side surface 504 that lead to internal manifolds in the drum section 330. Each of the internal manifolds, which are not shown, terminates in a plurality of openings 522 in the engaging surface 508 of the drum section 330. As shown, there are five holes 520 leading into five manifolds in each bag station 506, although the number of holes 520 and associated manifolds, as well as their locations, can vary. Because the primary manifold 420 is drawing air from each of the openings 522, the primary manifold 420 preferably has a flexible material to contact and seal itself against the side surface 504.

The orientation of the web 302 on the drum 320 is preferably controlled by the drum sections 330. This is especially needed when the web 302 has a fastener 304 and different laser power levels or durations are needed on the web 302, as opposed to the fastener 304. As such, the drum sections 330 are provided with a circumferential groove 532 in which the fastener 304 is located. When the fastener 304 is placed in the circumferential groove 532, the location of the web 302 is registered as well. Thus, the laser beams 400, 410 can precisely hit the fastener 304 and web 302 without wasting energy. It should also be noted that the system 300 is placed inside of a larger housing to reduce the emission of stray laser beam reflections that may occur during sealing or cutting. Alternatively or in addition to the foregoing, the region behind the radial projection of the laser beams 400, 410 can include black, non-reflective surfaces for absorbing the stray laser light.

Also shown best in FIG. 23, the drum section 320 has a plurality of grooves 430 that interact with the bag rejection station 460 and bag collection stations 470 to remove cut bags from the web 302. Specifically, the rejection station 460 and bag collection stations 470 have fingers that extend into these grooves 430 to pull the bag from the engaging surface 508.

As the web 302 moves with the drum sections 330 as the drum 320 rotates, it is preferred to have little tension so that there is no elastic "backlash" when a bag is cut from the web 302. Thus, the web 302 is held in tension by an amount of about 0.5 lbs. per inch of web material or less, such that a web 302 that is 11 inches in width (i.e., has 22 inches of web material because two panels define the bag), will have about 22 lbs. of force in tension.

While the present invention utilizing the rotating drum has been described for use with a web of polymeric material for making consumer bags, the concept of a laser beam being directed radially outward from an interior region of a rotating drum is useful for any flexible materials that may require processing with a laser (i.e., cutting, welding, sealing, imprinting, etc.). Such flexible materials are structures that can be continuously or intermittently advanced along the rotating drum without compromising the inherent integrity of the structure. For example, many polymers, elastomers, fibrous materials, and metallic foils would be such a flexible material.

Figure 24:
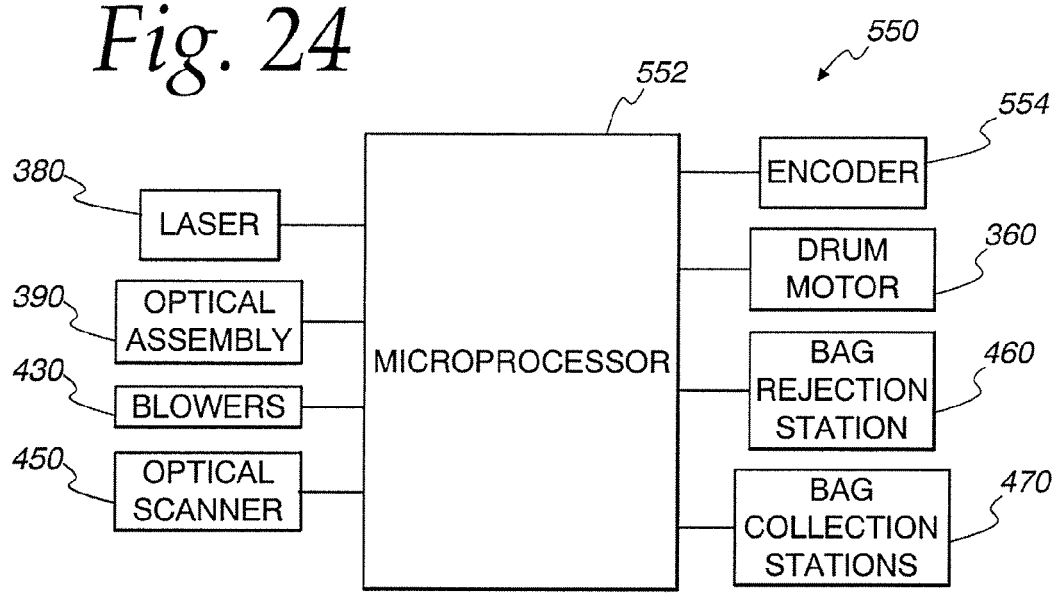
FIG. 24 is a block diagram illustrating the control system used for a machine that cuts and/or welds flexible material.

FIG. 24 schematically illustrates one type of control system 550 used with any of the aforementioned bag producing systems, although it will be described with reference to the bag producing system 300 of FIGS. 16-23. The control system 550 includes a main controller, such as a microprocessor 552, that receives input signals from and sends control signals to the various working components of the system. To determine the precise location of the drum 320 as it rotates around the central axis 370, an encoder 554 provides a signal to the microprocessor 552 that indicates the angular location of each drum section 330 and, hence, the location of the slots 514 relative to the radial direction of the laser beams 400, 410. The microprocessor 552 also is in communication with the motor 360 to control the rotation of the drum 320. This is important in start-up and stop conditions, but may also be used during normal operation if a minor incremental speed changes are needed to match the input of the incoming web 302. An overall assembly line controller may provide the microprocessor 552 with this kind of information.

The microprocessor 552 also controls the operation of the bag rejection station 460 and the bag collection stations 470. The microprocessor 552 receives inputs from the optical scanner 450 for determining whether to activate the bag rejection station 460, or allows the bag to advance to the bag collection stations 470.

The microprocessor 552 also controls the actuation of the blowers 430 in the vacuum system, or any other web-holding mechanisms. Again, this is important in start-up and stop conditions, but may also be used during normal operation if, for example, there are problems with removing the bags from the drum sections 330 due to too much vacuum force.

The microprocessor 552 also controls the power to the laser 380 to determine when it should be fired. This is primarily a function of the encoder 554 since the encoder 554 will provide signals indicating that the sots 514 are in a position to commence laser operation. Further, the microprocessor 552 may control the components in the optical assembly 390, such as galvanometers or steering mirrors, to move the beam across the web 302 and/or fastener 304. Also, if the fastener 304 includes an end clip, like end clip 24 in FIG. 1-6, the optical scanner 450 can determine whether the end-clip is positioned slightly closer to the leading edge or trailing edge of the slot 514. Thus, the microprocessor 552 may trigger the laser 380 to fire a few encoder pulses before or after the central point of the slot 514 to ensure the slightly off-center end-clip is cut at its mid-section. Thus, the optical scanner 450 can be used to "fine tune" the cutting location of the laser 380, or the encoder 554 can be removed completely and the laser 380 would be fired based only on the inputs from the optical scanner 450. Further, because the laser 380 may encounter more stress when cycling on and off, it may be desirable to maintain the laser 380 in an operational state. As such, the microprocessor 552 may determine that the laser 380 should be sent to a neutral or "idle" position where it does not impinge on the web 302 or fastener 304 after a laser processing step has been performed. Thus, the microprocessor 552 may steer the laser beam via the optical assembly 390 to an absorbent heat sink somewhere outside the focal point of the laser beam so that minimal damage to the heat sink occurs over time.

Figure 25A:
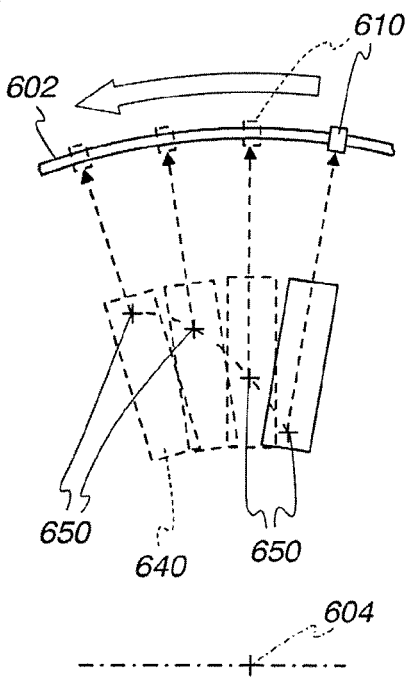
FIGS. 25a and 25b illustrate the operation of an alternative system.
Figure 25B:
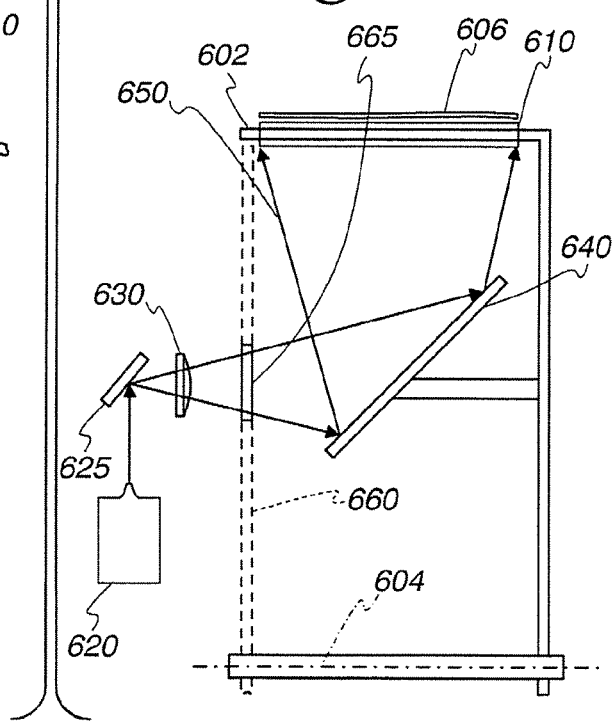

FIGS. 25A and 25B illustrate an alternative system 600 having a drum 602 that rotates around a central axis 604. A web 606 or other flexible material is held on the drum 602, preferably by the differential pressure created by a vacuum system. The drum 602 has a plurality of slots 610, which correspond to locations on the web 606 that are to be acted upon by a laser 620.

The laser 620 can be located outside of the drum 602 along with a galvanometer 625 and an associated f-theta lens 630. Unlike the previous embodiments, the slot 610 has an associated mirror 640 that is fixed to and rotates with the drum 602 so that the mirror 640 is positioned to reflect a laser beam 650 from the laser 620 into the slot 610. While the mirror 640 is flat, it could be curved to collimate or focus the laser beam 650. As shown best in FIG. 25A, the laser beam 650 is guided along a path on the mirror 640 as the drum 602 rotates, which causes the laser beam 650 to move along the slot 610 as the drum 602 rotates. Once the web 606 (and possibly an attached fastener) have been acted upon along the length of the slot 610, the galvanometer 625 moves the laser beam 650 back to the next slot 610 and the process begins again. As such, the path of the laser beam 650 from the f-theta lens 630 to the web 606 may be greater than the radius of the drum 602, which minimizes the angular movement of the galvanometer 625 that is needed for sweeping the laser beam 625 across the entire length of the slot 610, thereby increasing the processing speed of the system 600.

The system 660 also serves to keep the galvanometer 625 and laser 620 out of the interior of the drum 602. In doing so, the system 660 can be sealed by a barrier 660 having a window 665. The barrier 660 would allow a vacuum system to suction air from the interior of the drum 602, as opposed to using the side-mounted primary manifold 420 and series of openings 522 (and associated internal manifolds) in the drum sections 330 as described above with reference to FIGS. 16-23. The configuration of this system 600 also permits multiple lasers to process the web 606 on a single drum, either by having two lasers outside the drum 602 at different angular locations on the drum 602, or by using one laser inside the drum 602 to perform one function (e.g., work upon the fastener) and one laser (like the laser 620) outside of the drum 602 to perform a second function (e.g., work upon the web 606).

In each of the previous embodiments of FIGS. 1-25, the laser is preferably a $CO_2$ laser producing a wavelength of about 10 microns, which is efficiently absorbed by the materials in a typical polymeric web and fastener (e.g., polyethylene) and other organic materials. It is also possible to use green (~500 nanometers), blue (~450 nanometers) or UV lasers (<400 nanometers) since these short wavelengths are absorbed well by most polymers. Lasers producing this range of wavelengths include ion lasers (e.g., argon ion lasers), metal vapor lasers (e.g., copper vapor lasers), excimer lasers (e.g., krypton, fluoride, xenon chloride lasers), and sold-state lasers having converted wavelengths (e.g., ½ or ⅓ times the wavelength of a Nd:YAG or a Nd:YVO4 solid-state laser that typically produces energy at 1064 nanometers,). Further, the laser may be an ultra-fast laser with pulse durations of less than 100 picoseconds, although such lasers are more expensive than the previously mentioned types. These lasers are available for industrial processing with moderate to high powers and narrow beams capable of high-speed cutting.

It is also possible to use semiconductor laser devices which produce significant infrared power. The devices are highly reliable, but the beam size is large. However, it is likely that these semiconductor devices and their associated optics will produce even higher powers with smaller beams in the near future.

Because certain wavelengths, such as infrared at about 1 micron, are not absorbed in the polymeric films, it may possible to incorporate infrared opaque plastics onto the web or fastener (including the end-clip) such that the infrared energy is efficiently absorbed. For example, a small bead of dark plastic extruded into the fastener could be exposed to infrared energy and create a hot spot in predetermined areas while leaving adjacent locations unaffected. Or, opaque materials could be printed on the web at certain locations for creating welding sites. Similarly, the entire bag could be made of dyed material, or a layer of material could be entrained to enable selective welding or cutting. One of the benefits of this type of approach is that no masking of the adjacent areas (i.e., the slots in the drums) is needed since they do not absorb the light. Thus, the entire web can be exposed to the energy and the welding of materials to create a seal and/or cutting occurs in only the selected areas.

Furthermore, it is possible to selectively weld or cut a middle layer of several layers material if such middle layer included an infrared opaque material. This welding or cutting may be enhanced by providing one of the layers adjacent to the infrared-opaque, middle layer with a reflective layer, such as aluminized plastic, to focus the energy on only that middle layer.

While the invention has been described for use with cutting material, or sealing via a welding of two layers, the invention can be used for simply creating a line of weakness. For example, many packages containing prepackaged food have a line of weakness, usually in a header above the fastener, whereby the consumer will tear off a region of the package above the line of weakness to expose the fastener. These prepackaged food bags are usually created through some type of form-fill-seal machine and it is possible to use a laser to create the line of weakness, along with any other seal or cut in such bags. The line of weakness can be a series of perforations, or a generally constant line of thinned material causes by exposure to the laser. Additionally, the header of a package of prepackaged foods may have a punch-hole allowing it to be hung on a peg in a retail setting. Other packages may require a hole for handling the package. A laser can easily be used to form such holes in the material forming these packages.

The fastener may also be used to create a series of very small notches and/or a series of small beads from material on the fastener. Such structures can be performed by a pulsed laser. These series of structures would allow the fastener to have a tactile feedback mechanism, which is typically more useful when a slider is not located on the fastener, so that the user feels the fastener close when engaging the profiles with his or her fingers to seal the bag via the fastener. The laser may also weld two films together to make multiple compartments in one package. For example, the drum section 330 in FIGS. 21-23 may have a transverse slot perpendicular to and connecting two adjacent slots 514 for receiving a laser beam to seal the package at its midpoint. This would be advantageous if the web 302 in FIGS. 16-20 also included a recloseable fastener at its bottom, opposite the existing fastener 304, to develop two recloseable bags that are attached at their bottoms (i.e., the middle weld of the bag). Welding compartments could be advantageous in form-fill-seal machines, where multiple products are packaged together. The laser could also be used weld two individual food packages at their header and/or their footer. Further, additional components for the package, such as valves or tags, could be welded by use of a laser.

Finally, the laser could also be used for marking the packages with information or artwork. This would require much less power from the laser. Thus, the laser could perform functions related to the configuration of the bag, and functions related to the aesthetics of the bag.

Figure 11:
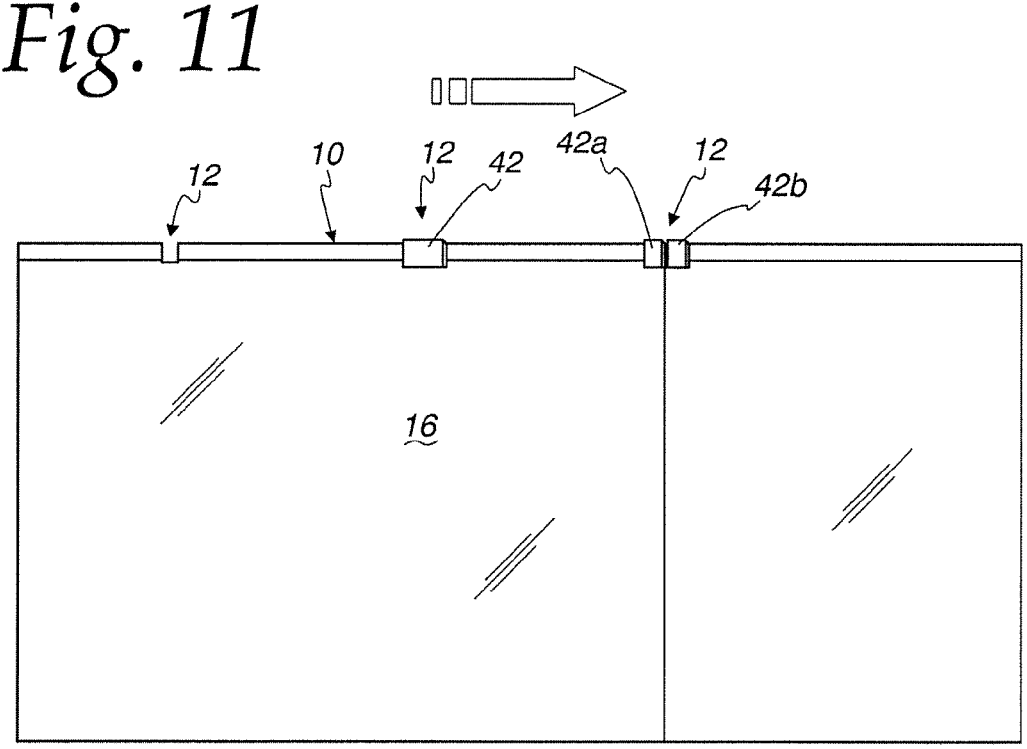
FIG. 11 is a side view of another alternative method of generating end terminations along a fastener at spaced pre-notched target locations using a laser.

While the present invention has been described with reference to one or more particular embodiments, those skilled in the art will recognize that many changes may be made thereto without departing from the spirit and scope of the present invention. For example, a laser may be used to generate end terminations of a pinch-to-close fastener as well as a slider-operated fastener. Also, as shown in FIG. 11, instead of cutting through the fastener 10 at each target location 12, the fastener 10 may be pre-notched, pre-cut, or extruded with a void at each target location 12. Then, after overmolding or overwrapping the fastener at a target location 12 to seal the profile ends on opposite sides of the target location 12, the laser is used to melt and divide the overmolded/overwrapped material 42 into two sections 42*a* and 42*b* where each section forms a slider end stop for its respective bag. Each of these embodiments and obvious variations thereof is contemplated as falling within the spirit and scope of the claimed invention, which is set forth in the following claims.

What is claimed is:

1. A system for forming segments from flexible material, comprising:
   a web of flexible material;
   a generally cylindrical drum having an exterior surface for receiving said web of flexible material, said drum including a plurality of slots extending between an interior surface of said drum and said exterior surface, adjacent ones of said plurality of slots being spaced apart by a distance corresponding to a length of each segment to be formed; and
   a laser for producing a laser beam that passes from an interior of said drum through said slots to divide said web of flexible material into separate segments disposed on said drum; and
   at least one removal station for removing individual segments from said drum.

2. The system of claim 1, wherein said flexible material is a polymeric material.

3. The system of claim 2, wherein said polymeric material includes at least two layers of material.

4. The system of claim 3, wherein said segments are bags created from said web of material.

5. The system of claim 1, wherein each of said segments is a recloseable bag, said flexible material includes a fastener to be used for said recloseable bag.

6. The system of claim 5, wherein said laser provides end terminations for said fastener.

7. The system of claim 6, wherein said end terminations are comprised of material of said fastener.

8. The system of claim 6, wherein said end terminations are comprised of material of an additional component held on said fastener.

9. The system of claim 5, wherein said drum includes a groove in which said fastener resides for registering the location of said fastener on said drum.

10. The system of claim 1, further including a vacuum system for holding said flexible material on said drum.

11. The system of claim 1, wherein each slot has a length greater than a width of said web of flexible material.

12. The system of claim 3, wherein the laser beam seals at least a portion of the at least two layers of material together along the slot.

13. The system of claim 1, wherein said at least one removal station includes at least one finger member operatively disposed between said flexible material and said drum.

14. The system of claim 1, further comprising a first removal station and a second removal station, said first removal station spaced a distance from said second removal station.

15. The system of claim 14, wherein said first removal station is a segment rejection station and said second removal station is a segment collection station.

16. The system of claim 6, wherein said end termination is formed perpendicular to the fastener.

17. The system of claim 6, wherein said end termination is formed at an angle to the fastener.

18. A system for forming segments from flexible material, comprising:
   a web of at least two layers of flexible material;
   a generally cylindrical drum having an exterior surface for receiving said web, the drum including a plurality of slots extending between an interior surface of the drum and the exterior surface, each slot corresponding to an end of a segment to be formed in the web; and
   a laser for producing a laser beam that passes from an interior of said drum through the slots, the laser beam sealing at least a portion of the at least two layers of material together along the slot between separate segments formed in the web, said segments being disposed on said drum; and
   at least one removal station for removing said segments from said drum, said at least one removal station including at least one finger member operatively disposed between said flexible material and said drum.

19. The system of claim 18 wherein each slot has a length greater than a width of the web of flexible material.

20. The system of claim 19, wherein the laser beam translates across the width of the web of flexible material.

21. The system of claim 20, wherein the laser beam cuts through the web of flexible material to divide the web of flexible material into said segments.

22. The system of claim 20, wherein the laser beam forms a continuous cut line through the web of flexible material.

23. The system of claim 18, wherein the segments are bags created from the web of material.

24. The system of claim 18, wherein the web of flexible material includes a fastener comprised of first and second profiles, the laser beam sealing the first and second profiles together.

25. The system of claim 24, wherein the laser forms end terminations comprised of material of the fastener.

26. The system of claim 24, wherein the drum includes a groove in which the fastener resides to register a location of the fastener on the drum.

27. The system of claim 18, further comprising a vacuum system to hold the flexible material on the drum.

28. The system of claim 18, further comprising first and second removal stations whereat segments of the web of flexible material are removed from the drum, said first removal station spaced a distance from said second removal station.

29. The system of claim 13, wherein said exterior surface of said drum includes at least one groove configured to receive said at least one finger member.

30. The system of claim 18, wherein said exterior surface of said drum includes at least one groove configured to receive said at least one finger member.

31. The system of claim 28, wherein said first removal station is a segment rejection station and said second removal station is a segment collection station.

32. The system of claim 25, wherein said end terminations are formed perpendicular to the fastener.

33. The system of claim 25, wherein said end terminations are formed at an angle to the fastener.

* * * * *

UNITED STATES PATENT AND TRADEMARK OFFICE
CERTIFICATE OF CORRECTION

| | | |
|---|---|---|
| PATENT NO. | : 7,750,269 B2 | Page 1 of 1 |
| APPLICATION NO. | : 11/742294 | |
| DATED | : July 6, 2010 | |
| INVENTOR(S) | : Ian J. Barclay, Michael W. McManus and Dana A. Marshall | |

It is certified that error appears in the above-identified patent and that said Letters Patent is hereby corrected as shown below:

Title Page;

ON THE COVER OF THE PATENT:
After heading:
(65)
Prior Publication Data
US 2007/0199928 A1 August 30, 2007

Please insert:

--Related U.S. Application Data
(63) Continuation of application No. 10/021,236, filed on October 30, 2001, now U.S. Patent No. 7,214,173.
(60) Provisional application No. 60/244,281, filed on October 30, 2000.--

Signed and Sealed this
Thirty-first Day of May, 2011

David J. Kappos
*Director of the United States Patent and Trademark Office*